(12) United States Patent
Li et al.

(10) Patent No.: US 8,436,904 B2
(45) Date of Patent: May 7, 2013

(54) METHOD AND APPARATUS FOR CALIBRATING VIDEO CAMERA

(75) Inventors: Kai Li, Shenzhen (CN); Jing Wang, Shenzhen (CN); Yuan Liu, Shenzhen (CN); Ping Fang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 438 days.

(21) Appl. No.: 12/757,211

(22) Filed: Apr. 9, 2010

(65) Prior Publication Data

US 2010/0259624 A1   Oct. 14, 2010

Related U.S. Application Data

(63) Continuation of application No. PCT/CN2008/072800, filed on Oct. 23, 2008.

(30) Foreign Application Priority Data

Oct. 24, 2007   (CN) .......................... 2007 1 0182044

(51) Int. Cl.
  *H04N 13/02*   (2006.01)
  *H04N 17/00*   (2006.01)
(52) U.S. Cl.
  USPC ........................................... 348/187; 348/47
(58) Field of Classification Search .................. 348/187, 348/189, 175, 176, 180, 188, 46–50; 901/47
See application file for complete search history.

(56) References Cited

U.S. PATENT DOCUMENTS 5,444,481 A  *  8/1995  Ohshima et al. ............. 348/187
(Continued)

FOREIGN PATENT DOCUMENTS

CN   1975638 A   6/2007
CN   101021947 A   8/2007
(Continued)

OTHER PUBLICATIONS

Supplementary European Search Report dated (mailed) Sep. 17, 2010, issued in related Application No. 08845641.3-2218, PCT/CN2008072800, filed Oct. 23, 2008, Hauwei Technologies Co., Ltd. (3 pages).

(Continued)

*Primary Examiner* — Victor Kostak
(74) *Attorney, Agent, or Firm* — Leydig, Voit & Mayer, Ltd.

(57) ABSTRACT

A method for calibrating the video camera includes: obtaining the internal and external parameters of the video camera according to a reference template; recording data of a reference object in the scene; obtaining images of the reference object from at least two perspectives; and obtaining the internal and external parameters of the video camera according to the recorded data of the reference object. An apparatus for calibrating the video camera includes: a preliminary calibration unit, configured to obtain the internal and external parameters of the video camera according to a reference template, and record the data of a reference object in the scene; a recalibration unit, configured to obtain images of the reference object from at least two perspectives, and obtain the internal and external parameters of the video camera according to the recorded data of the reference object. The invention is applicable to various scenes and features simple operations.

19 Claims, 6 Drawing Sheets

U.S. PATENT DOCUMENTS

| 5,699,440 | A | * | 12/1997 | Carmeli | 382/100 |
|---|---|---|---|---|---|
| 5,878,151 | A | * | 3/1999 | Tang et al. | 382/103 |
| 6,384,871 | B1 | * | 5/2002 | Wilf et al. | 348/578 |
| 7,023,472 | B1 | * | 4/2006 | Kang et al. | 348/187 |
| 2002/0186897 | A1 | | 12/2002 | Kim et al. | |
| 2003/0210381 | A1 | * | 11/2003 | Itaki | 353/70 |
| 2005/0185049 | A1 | * | 8/2005 | Iwai et al. | 348/47 |
| 2005/0207640 | A1 | | 9/2005 | Kim et al. | |

FOREIGN PATENT DOCUMENTS

| CN | 101025824 A | 8/2007 |
|---|---|---|
| WO | WO 2005/122090 A1 | 12/2005 |
| WO | WO 2009/056050 A1 | 5/2009 |

OTHER PUBLICATIONS

Written Opinion of the International Searching Authority (translation) dated (mailed) Feb. 5, 2009, issued in related Application No. PCT/CN2008/072800, filed Oct. 23, 2008, Huawei Technologies Co., Ltd. (5 pages).

M. Machacek et al., Two-step calibration of a stereo camera system for measurements in large volumes, Institute of Physics Publishing, Measurement Science and Technology, Institute for Fluid Dynamics, Sonneggstrasse 3, ETH Zurich, Switzerland, Meas. Sci. Technol. 12 (2003) (pp. 1631-1639).

International Search Report from P.R. China in International Application No. PCT/CN2008/072800 mailed Feb. 5, 2009.

* cited by examiner

METHOD AND APPARATUS FOR CALIBRATING VIDEO CAMERA

CROSS-REFERENCE TO RELATED APPLICATIONS

This application is a continuation of International Application No. PCT/CN2008/072800, filed on Oct. 23, 2008, which claims priority to Chinese Patent Application No. 200710182044.0, filed on Oct. 24, 2007, both of which are hereby incorporated by reference in their entireties.

FIELD OF THE INVENTION

The present invention relates to an image processing technology, and in particular, to a method and an apparatus for calibrating a video camera.

BACKGROUND

In the stereo vision system of a video camera, in order to obtain the depth or parallax information of an object in the scene, it is necessary to obtain projection relation between the coordinates of a certain point of the object in the world coordinate system and the coordinates of an imaging point of the object on the imaging plane. The video camera calibration technology is developed to record such information.

This technology is designed to obtain the internal and external parameters of the video camera. Geometrical and optical features of the video camera are called internal parameters, and the position relation of the coordinate system of the video camera relative to the space coordinate system is called external parameters.

Generally, three methods are available for calibrating the video camera, including traditional calibration, active vision-based calibration, and auto-calibration.

Traditional calibration refers to: using a precision machined calibration block as the reference template to calculate the internal and external parameters of the video camera by establishing mapping between the existing points on the three-dimensional (3D) coordinates on the calibration block and the image points thereof.

Active vision-based calibration refers to: controlling the video camera to make special movement, for example, rotating around the optical center or moving horizontally, and calculating the internal parameters based on the specialty of such movement.

Auto-calibration refers to: assuming that no internal parameter is changed and mapping between image points is established when shooting different images, calibrating the video camera according to such mapping between the image points and special constraints between the imaging points in multiple images.

Through research and practice, the inventor has identified the following problems with the art mentioned above.

1. Regarding the traditional calibration, a calibration block is needed each time when the angle or position of the video camera is changed. However, placing the calibration block in a scene for a long time may make the scene to be inharmonious, and is not allowed in some scenes. Moreover, it is also inconvenient to replace the calibration block each time when the angle or position of the video camera is changed.

2. Regarding active vision-based calibration, the video camera needs to be controlled to make special movement. Such movement, however, cannot be perceived or controlled in some circumstances. In such cases, this method cannot be used.

3. Regarding auto-calibration, the video camera is calibrated on the assumption that the internal parameters remain unchanged and mapping between image points is determined. Thus, the calibration is neither precise nor stable. Therefore, such method is not applicable if any internal parameter is changed.

SUMMARY

A method and an apparatus for calibrating a video camera are provided in the embodiments of the present invention. Such a method and an apparatus are applicable to multiple scenes and feature easy operation and high precision.

A method for calibrating a video camera is provided in an embodiment of the present invention to solve the above-mentioned technical problems. This method includes:

obtaining internal and external parameters of the video camera according to the reference template, and recording data of the reference object in the scene; and when the video camera needs calibration, obtaining images of the reference object from at least three perspectives, obtaining the internal and external parameters of the video camera according to the recorded data of the reference object, and calibrating the video camera.

A method for calibrating the video camera is further provided in an embodiment of the present invention. This method includes:

obtaining internal and external parameters of the video camera according to the reference template, and recording data of the reference object in the scene; and when the video camera needs calibration, obtaining images of the reference object from at least two perspectives, obtaining the internal and external parameters of the video camera according to the recorded data of the reference object, and calibrating the video camera.

An apparatus for calibrating the video camera is further provided in an embodiment of the present invention. This apparatus includes:

a preliminary calibration unit, configured to: obtain internal and external parameters of the video camera according to the reference template, and record data of the reference object in the scene; and a recalibration unit, configured to: when the video camera needs calibration, obtain images of the reference object from at least three perspectives, obtain the internal and external parameters of the video camera according to the recorded data of the reference object, and calibrate the video camera.

An apparatus for calibrating the video camera is further provided in an embodiment of the present invention. This apparatus includes:

a preliminary calibration unit, configured to: obtain internal and external parameters of the video camera according to the reference template, and record data of the reference object in the scene; and a recalibration unit, configured to: when the video camera needs calibration, obtain images of the reference object from at least two perspectives, obtain the internal and external parameters of the video camera according to the recorded data of the reference object, and calibrate the video camera.

As described in the forgoing technical solution, to calibrate a video camera, a reference template is needed only when shooting a new scene. During the preliminary calibration, information of the next reference object needs to be recorded. Then, it is only necessary to maintain the reference object in the scene, and the reference object can be used for calibrating the video camera. It is no longer necessary to use the reference template for calibration each time when the shooting angle or position of the video camera is changed, thereby simplifying operation and being applicable to various scenes. Moreover, such a solution is also applicable even if movement of the video camera is unperceivable or uncontrollable. In addition, because a precision machined reference template with given data is used in the preliminary calibration, and data of the reference object recorded in the preliminary calibration is accurate, precision of calibration based on the data of the reference object is quite high.

DETAILED DESCRIPTION OF THE EMBODIMENTS

A method and an apparatus for calibrating the video camera are provided in the embodiments of the present invention. The method and apparatus for calibrating the video camera are applicable to multiple scenes and feature easy operation and high precision.

Figure 1:
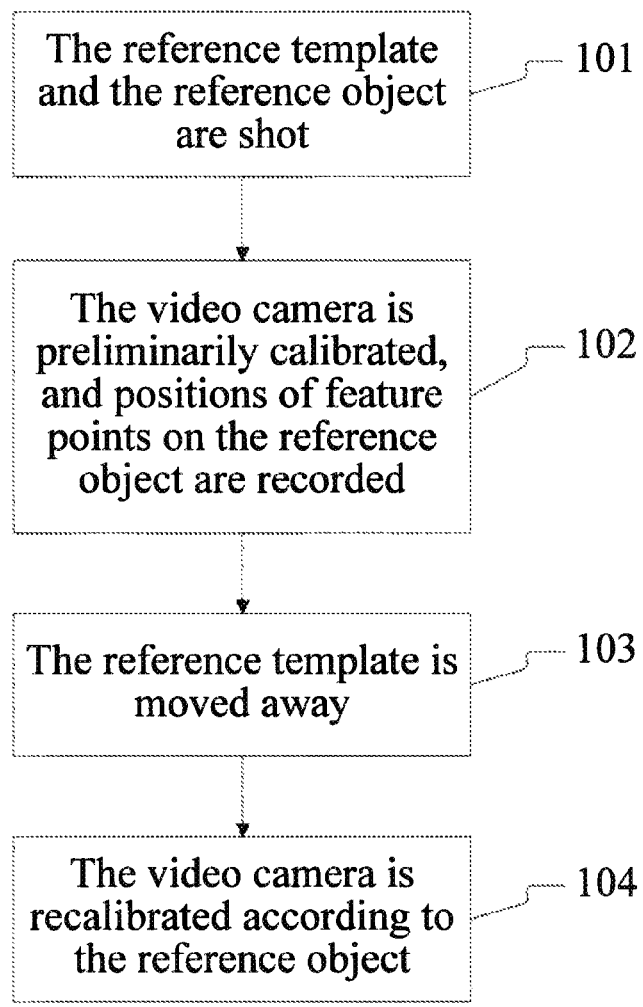
FIG. 1 is a flowchart of a first embodiment of a method for calibrating the video camera of the present invention.

FIG. 1 is a flowchart of a first embodiment of a method for calibrating the video camera of the present invention.

Step 101: A reference template and a reference object are shot.

When the video camera is used for shooting a new scene, a reference template needs to be placed in this scene, and an object in the vicinity of the reference template in this scene is chosen as the reference object.

Figure 2:
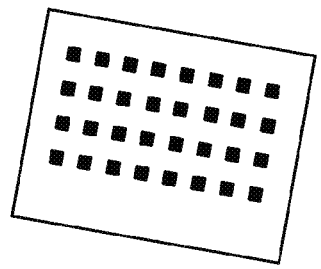
FIG. 2 shows a tessellation.
Figure 3:
FIG. 3 shows a rectangle inscribed in a circle.

In this step, the reference template can be a precision machined calibration block or any other object with given data, such as a tessellation or a rectangle inscribed in a circle. FIG. 2 shows the tessellation, and FIG. 3 shows the rectangle inscribed in the circle.

In this step, any object in the scene can be used as the reference object if it is near enough to the reference template to be shot in the scene. Given several options, an object with geometric features is preferred, for example:

quasi-rectangular object or any object with rectangular design, such as nameplates, notebooks, notepads, floor tiles, and rectangular characters on nameplates, which are all designed with right angles and straight lines, while characters on the nameplates are rectangular;

round object or any object with round design, such as mugs and nine round keys on a telephone; and linear objects, such as the brim of a notebook, pens, fluorescent tubes, and intersecting lines of walls.

After the reference object is chosen, the reference template and the reference object are shot from different perspectives.

Step 102: The video camera is preliminarily calibrated, and positions of feature points on the reference object are recorded.

As the data of the reference template is given in advance, the internal and external parameters of the video camera can be obtained by using the reference template. Then, the video camera is calibrated, and positions of the feature points on the reference object are recorded.

Step 103: The reference template is moved away.

In this step, the reference template can be moved away to facilitate subsequent operations.

Step 104: The video camera is recalibrated according to the reference object.

When the position or shooting angle of the video camera is changed due to a certain reason and recalibration is required, the reference object chosen in the preliminary calibration can be used to recalibrate the video camera. This is because:

In step 102, the data of the reference template is given, and positions of the feature points on the reference object can be accurately recorded according to the reference template. Then, for the video camera, the data of the reference object is given. Therefore, the video camera can be recalibrated according to the reference object. Since the data of the reference object recorded according to the reference template in the preliminary calibration is highly precise, the precision of recalibrating the video camera according to the reference object is high.

The method for calibrating the video camera provided in the present invention is detailed through embodiments hereinafter.

Figure 4:
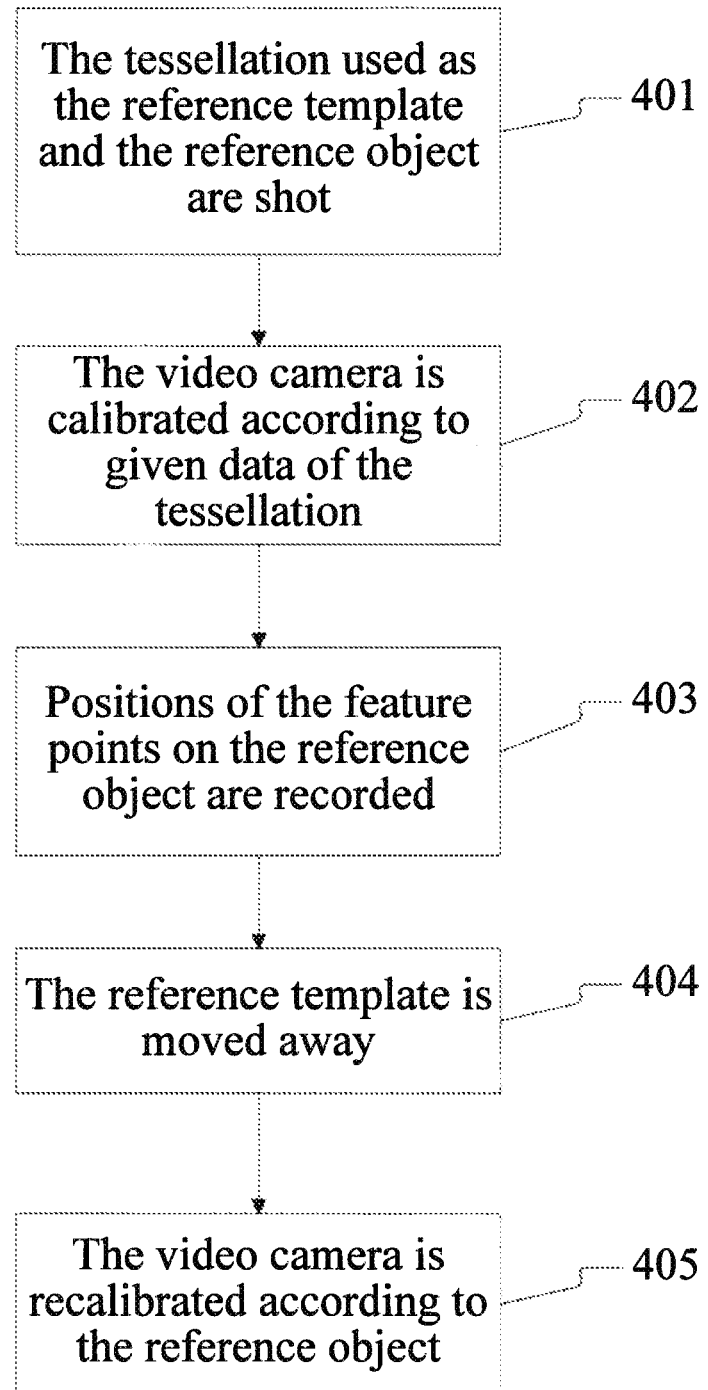
FIG. 4 is a flowchart of a second embodiment of a method for calibrating the video camera of the present invention.

FIG. 4 is a flowchart of a second embodiment of a method for calibrating the video camera of the present invention, in which a tessellation is used as the reference template.

Step 401: The tessellation used as the reference template and a reference object are shot.

When the video camera is used for shooting a new scene, a tessellation used as the reference template needs to be placed in this scene, and an object in the vicinity of the tessellation is chosen as the reference object. The object that is not easily taken away is preferred.

After the reference object is chosen, the tessellation used as the reference template and the reference object are shot by the video camera from at least three perspectives.

Step 402: The video camera is calibrated according to the given data of the tessellation.

Figure 5:
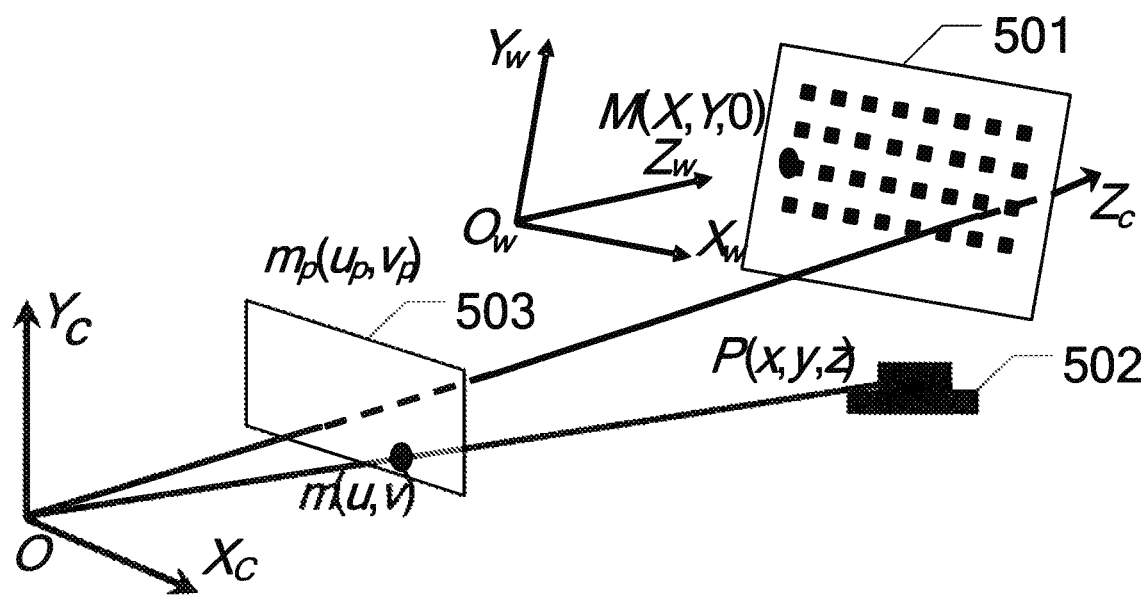
FIG. 5 shows relation among the tessellation, reference object, image plane, and coordinate system of the video camera in an embodiment of the present invention.

FIG. 5 shows relation among the tessellation, reference object, image plane, and coordinate system of the video camera.

In FIG. 5, $X_C Y_C Z_C$ denotes the coordinate system of the video camera, and $X_W Y_W Z_W$ denotes the world coordinate system.

The imaging geometrical relation between the image point m(u, v) on image plane 503 and the space object point M (X, Y, 0) on tessellation 501 is shown as follows:

$$sm = K[Rt]M.$$

The tessellation 501 used as the reference template is a precision machined plane template, and all the data such as the size, quantity, and sequence of grids is given. Therefore, the data of the space object point on the tessellation 501 is given. Assuming that the tessellation 501 lies on the world coordinate system Z=0, the above equation is translated into a perspective projection matrix in case of homogeneous coordinates as follows:

$$s\begin{bmatrix}u\\v\\1\end{bmatrix} = K[r_1\ r_2\ r_3\ t]\begin{bmatrix}X\\Y\\0\\1\end{bmatrix} = K[r_1\ r_2\ t]\begin{bmatrix}X\\Y\\1\end{bmatrix} = H\begin{bmatrix}X\\Y\\1\end{bmatrix}$$

where: K denotes the internal parameter matrix of the video camera; $\tilde{M}=[X\ Y\ 1]^T$ denotes the homogeneous coordinates of the space object point M (X, Y, 0) on tessellation 501; $\tilde{m}=[u\ v\ 1]^T$ denote the homogeneous coordinates of the point m(u, v) which corresponds to a point projected from the tessellation 501 onto the image plane 503; and R and t respectively denote the spin matrix and translation vector of the coordinate system of the video camera relative to the world coordinate system.

In $$H = [h_1\ h_2\ h_3] = \lambda K[r_1\ r_2\ t] \Rightarrow r_1 = \frac{1}{\lambda}K^{-1}h_1,\ r_2 = \frac{1}{\lambda}K^{-1}h_2,$$

λ denotes the scale factor.

According to characteristics of the spin matrix, $r_1$ and $r_2$ denote orthogonal vectors, that is, $r_1^T r_2 = 0$ and $\|r_1\|=\|r_2\|=1$. Each image obtained by shooting can have the following two basic constraints on the internal parameter matrix:

$h_1^T K^{-T} K^{-1} h_2 = 0$ and $h_1^T K^{-T} K^{-1} h_1 = h_2^T K^{-T} K^{-1} h_2$.

As five internal parameters of the video camera are unknown, when the number of images obtained by shooting is equal to or greater than three, these five internal parameters of the video camera can be obtained uniquely through the liner equation.

Through $h_1^T K^{-T} K^{-1} h_2 = 0$ and $h_1^T K^{-T} K^{-1} h_1 = h_2^T K^{-T} K^{-1} h_2$, the internal parameter K is obtained, and then the spin matrix R and translation vector t, external parameters of the video camera, can be obtained as follows:

$r_1 = \lambda K^{-1} h_1, r_2 = \lambda K^{-1} h_2, r_3 = r_1 \times r_2, t = \lambda K^{-1} h_3$, where
$\lambda = 1/\|K^{-1}h_1\| = 1/\|K^{-1}h_2\|$.

By then, calibration of the video camera is complete.

Step 403: Positions of the feature points on the reference object are recorded.

The obtained internal and external parameters of the video camera are used for determining positions of the feature points on the reference object in the vicinity of the tessellation, namely, the coordinates of the feature points in the 3D space or in the world coordinate system.

The recording process is detailed as follows.

Generally, according to the epipolar projective geometry, the following can be obtained:

$$\begin{cases}\lambda_i m_i = K[I, 0]M_i = PM_i\\ \lambda'_i m'_i = K[R, t]M_i = P'M_i\end{cases}$$

where: $m_i$ and $m'_i$ respectively denote the two image points of the space points $M_i$ and $M_i'$ on the projection plane of the video camera; $\lambda_i$ and $\lambda'_i$ respectively denote the two corresponding scale factors of the projected space points of the video camera on the image plane; P and P' respectively denote the projection matrix of the video camera when the space points are projected onto the corresponding image plane; K denotes the internal parameter matrix of the video camera; and [R, t] denotes the external parameter matrix of the video camera, that is, the spin matrix and the translation vector.

In the case that internal and external parameters of the video camera are given, the coordinates of the space points can be inversely deduced in light of the image points, as shown below:

$$\begin{cases}M_i \approx P^+ m_i\\ M'_i \approx (P')^+ m'_i\end{cases}$$

where, $P^+ = P^T(PP^T)^{-1}$ and $(P')^+ = P'^T(P'\ P'^T)^{-1}$ denote the pseudo-inverse matrixes of P and P' respectively; P=K[I,0], P'=K[R,t]; $M_i$ and $M'_i$ respectively denote the space points of image points $m_i$ and $m'_i$ that are inversely projected in the 3D space; and "≈" denotes that only one scale factor is missing in the equation.

By then, positions of the feature points on the reference object are recorded.

Step 404: The tessellation used as the reference template is moved away.

At this time, the tessellation used as the reference template can be moved away to facilitate subsequent operations.

Step 405: The video camera is recalibrated according to the reference object.

When the position or shooting angle of the video camera is changed due to a certain reason and recalibration is required, the reference object chosen in the preliminary calibration can be used to recalibrate the video camera.

Assuming that a nameplate is chosen as the reference object, the video camera can be recalibrated according to information recorded in step 403 about positions of the feature points on the nameplate used as the reference object. In other words, the tessellation is replaced by the calibrated nameplate, and the nameplate is used as a new reference template to recalibrate the video camera. Details thereof are as follows:

shooting the nameplate from at least three perspectives to obtain the images;

using Hough transformation to detect the straight lines on the nameplate, such as four borders of the name side, supporting triangle sides, and straight lines in the character;

fitting all the lines and establishing the coordinate equation to obtain the positions of vertexes and of the point where the diagonals intersect; and obtaining the coordinates of image points of characters on the nameplate and the corresponding coordinates of the nameplate in the world coordinate system; and using the coordinates of images of feature points, corresponding coordinates in the world coordinate system, and linear equation to obtain the internal and external parameters of the video camera.

Currently, the video camera is recalibrated. As described above, to calibrate the video camera in this embodiment, a reference template is required for calibration only when a new scene is to be shot. In preliminary calibration, information of the next reference object needs to be recorded at the same time. Then, it is only necessary to maintain the reference object in the scene to be shot, and the reference object can be used for calibration. It is no longer necessary to use the reference template for calibration each time when the position or shooting angle of the video camera is changed, thus simplifying operations and being applicable to various scenes. Moreover, such a solution is also applicable if the movement of the video camera is unperceivable or uncontrollable. In addition, because a precision machined reference template with given data is used in the preliminary calibration, and data of the reference object recorded in the preliminary calibration is accurate, precision of calibration based on the data of the reference object is quite high.

Figure 6:
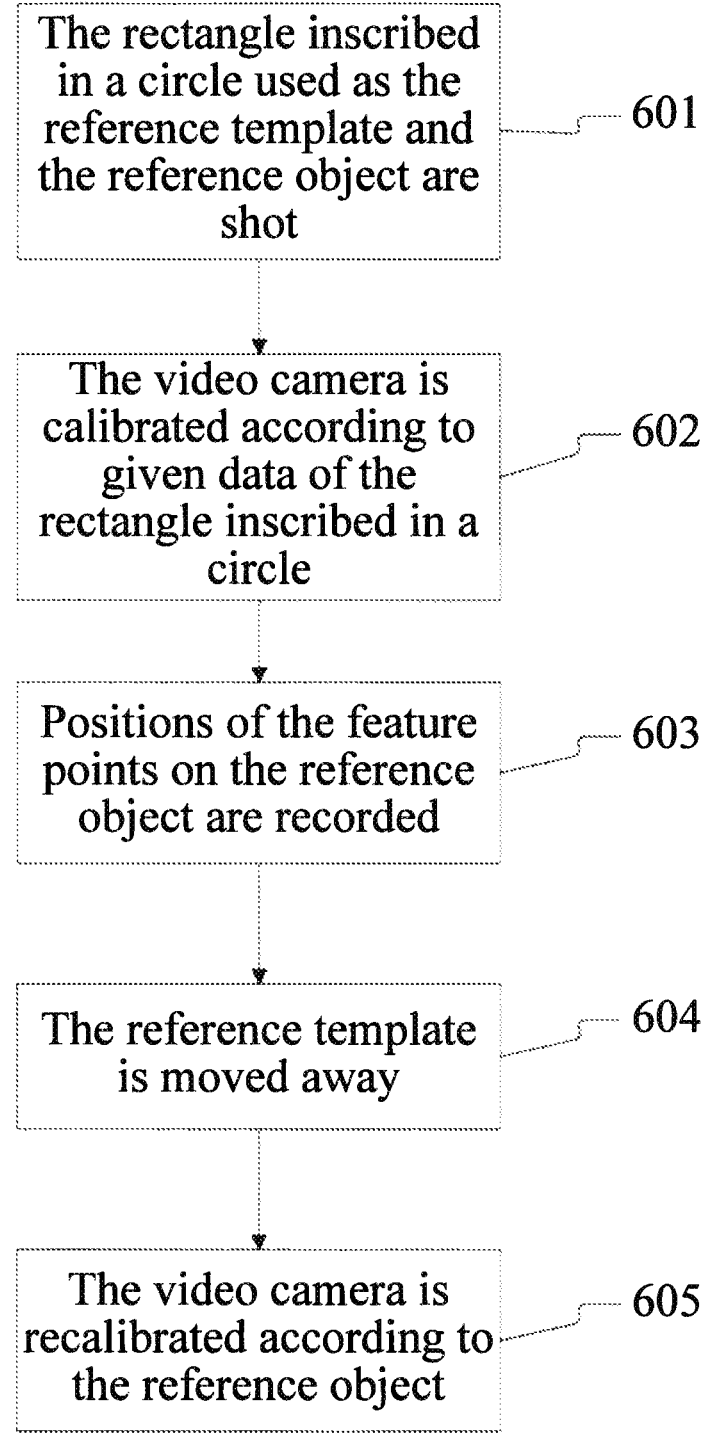
FIG. 6 is a flowchart of a third embodiment of a method for calibrating the video camera of the present invention.

FIG. 6 is a flowchart of a third embodiment of a method for calibrating the video camera of the present invention, in which a rectangle inscribed in a circle is used as the reference template.

Step 601: The rectangle inscribed in the circle used as the reference template and a reference object are shot.

When the video camera is used for shooting a new scene, a rectangle inscribed in a circle used as the reference template needs to be placed in this scene, and an object in the vicinity of the rectangle inscribed in the circle is chosen as the reference object. The object that is not easily taken away is preferred.

After the reference object is chosen, the rectangle inscribed in the circle used as the reference template and the reference object are shot from at least three perspectives.

Step 602: The video camera is calibrated according to given data of the rectangle inscribed in the circle.

Figure 7:
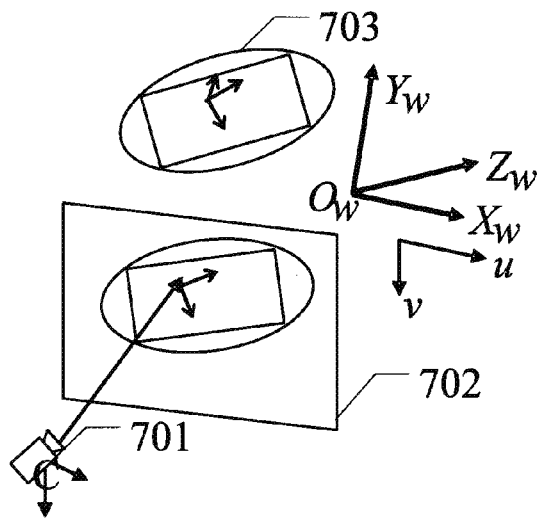
FIG. 7 shows relation among the rectangle inscribed in the circle, image plane, and coordinate system of the video camera in an embodiment of the present invention.

FIG. 7 shows relation among the rectangle inscribed in the circle, image plane, and coordinate system of the video camera.

In FIG. 7, 701 denotes the coordinate system of the video camera, 702 denotes the image plane, 703 denotes the rectangle inscribed in the circle used as the reference template, and $X_W Y_W Z_W$ denotes the world coordinate system.

Firstly, the module is calibrated for the video camera.

The origin of the world coordinate system is set to the center of the rectangle inscribe in the circle 703, with the Z-axis perpendicular to the plane where the rectangle inscribed in the circle is. Then, the corresponding homogeneous coordinates of the point $[X_w\ Y_w\ 0]^T$ on the circle are shown below:

$$M=[X_w, Y_w, 0, 1]^T.$$

Then, $V_{Mi}$ is set to denote the four points where the circle intersects the rectangle:

$$V_{Mi}=[X_M^i Y_M^i 1]^T (i=1,2,3,4).$$

Thus, the homogeneous coordinates corresponding to the image point (u, v) in the circle are:

$$m=[u v 1]^T.$$

The perspective projection transformation between image points and world coordinates is:

$$sm=PM, \text{ where:}$$

$$P=K[RT]=(p_{ij})_{3\times 4}.$$

P denotes the projection transformation matrix, and $\lambda$ denotes the scale factor;

$$K = \begin{pmatrix} \alpha & \gamma & u_0 \\ 0 & \beta & v_0 \\ 0 & 0 & 1 \end{pmatrix} \quad (15)$$

K denotes the internal parameter matrix of the video camera;

$$R = \begin{pmatrix} r_{11} & r_{12} & r_{13} \\ r_{21} & r_{22} & r_{23} \\ r_{31} & r_{32} & r_{33} \end{pmatrix} = (r_1\ r_2\ r_3)$$

R denotes the unit spin matrix of the external parameters of the video camera; and $$T=(t_x,t_y,t_z)^T$$

T denotes the translation vector of the external parameters of the video camera.

At this time, the internal and external parameters are obtained and preliminary calibration of the video camera is complete.

Step 603: Positions of the feature points on the reference object are recorded.

The process of recording positions of the feature points on the reference object includes: obtaining the closed form solution of the video camera, performing non-linear optimization, and determining the positions of the feature points on the object in the vicinity of the reference template according to the obtained internal and external parameters of the video camera, where the process of obtaining the closed form solution of the video camera includes:

deducing the following formula according to the equation sm=PM:

$$\begin{cases} u = \dfrac{p_{11}X_W + p_{12}Y_W + p_{14}}{p_{31}X_W + p_{32}Y_W + p_{34}} \\ v = \dfrac{p_{21}X_W + p_{22}Y_W + p_{24}}{p_{31}X_W + p_{32}Y_W + p_{34}} \end{cases}$$

that is:

$$\begin{cases} X_w = a_1 u + b_1 v + c_1 \\ Y_w = d_1 u + e_1 v + f_1 \end{cases}$$

where, $a_1$, $b_1$, $c_1$, $d_1$, $e_1$, $f_1$ depend on the internal and external parameters of the video camera.

In the world coordinate system, values of coordinates of the point $[X_w\ Y_w\ 0\ 1]^T$ on the circle satisfy the following equation:

$$X_w^2 = Y_w^2 = r^2$$

where, r denotes the radius of the circle of the rectangle inscribed in the circle 703 and is given data. Therefore, the following formula can be deduced:

$$(X_w\ Y_w\ 0\ 1)\begin{pmatrix} 1 & 0 & 0 & 0 \\ 0 & 1 & 0 & 0 \\ 0 & 0 & 0 & 0 \\ 0 & 0 & 0 & -r^2 \end{pmatrix}\begin{pmatrix} X_w \\ Y_w \\ 0 \\ 1 \end{pmatrix} = (X_w\ Y_w\ 0\ 1)C\begin{pmatrix} X_w \\ Y_w \\ 0 \\ 1 \end{pmatrix}$$

$$= 0.$$

The four sides of the rectangle that are projected on the image plane 702 are detected by Hough transformation, and lines where the four sides are located are fit through a linear equation as follows:

$$l_i = (l_{i1} l_{i2})^T$$

where: I=1, 2, 3, 4; $l_{ij}$, j=1, 2. The values of 1 and i are not equal to 0 at the same time.

The lines where the four sides are located on the image plane 702 are expressed in the following equation:

$$l_{i1}x + l_{i2}y = 0 (i=1,2,3,4).$$

The lines $l^j = (l^{j1} \; l^{j2})^T$ (j=1,2) where the diagonals are located are expressed in the following equation:

$$l^{j1}x + l^{j2}y = 0 (j=1,2).$$

Therefore, coordinates of four vertexes $V_{mi}$ of the rectangle that is projected on the image plane 702 can be deduced as follows:

$$V_{mi} = [u_m^i v_m^i 1]^T (i=1,2,3,4).$$

These four vertexes $V_{mi}$ are also located on a quadratic curve, that is, the image curve of the circle projected on the image plane 702.

According to the unchangeable features of projection, the coordinates of the point O' where the diagonals intersect in the rectangle that is projected on the image plane 702 are the coordinates of the image point of the center O of the circle that is projected on the image plane 702.

The values of the image point (u, v) of the circle can satisfy an elliptic quadratic equation. This equation can be determined by five coordinates including the coordinates of the four vertexes and the coordinates of the point where the diagonals intersect in the rectangle that is projected; or, the curve coefficients can be obtained through quadratic curve fitting:

$$au^2 + buv + cv^2 + du + ev + g = 0.$$

In light of the quadratic form of the advanced algebra, $m^T Qm = 0$, where Q is symmetrically expressed by parameters a, b, c, d, e, and g:

$$Q = \begin{pmatrix} a & b/2 & d/2 \\ b/2 & c & e/2 \\ d/2 & e/2 & g \end{pmatrix}.$$

Till now, relation between five point pairs is established. The four vertexes of the rectangle inscribed in the circle 703 correspond to those four corresponding points on the image plane 702, and the center of the rectangle inscribed in the circle 703 corresponds to the corresponding point on the image plane 702. Furthermore, the values of all these point pairs can satisfy the equation: $m = [u \; v \; 1]^T$, where the values of the four pairs of vertexes can satisfy the following equation:

$$au^2 + buv + cv^2 + du + ev + g = 0$$

$$(X_w \; Y_w \; 0 \; 1) \begin{pmatrix} 1 & 0 & 0 & 0 \\ 0 & 1 & 0 & 0 \\ 0 & 0 & 0 & 0 \\ 0 & 0 & 0 & -r^2 \end{pmatrix} \begin{pmatrix} X_w \\ Y_w \\ 0 \\ 1 \end{pmatrix} = (X_w \; Y_w \; 0 \; 1) C \begin{pmatrix} X_w \\ Y_w \\ 0 \\ 1 \end{pmatrix}$$
$$= 0$$

Then, results are:

$$sV_{mi} = PV_{Mi}, sC_0 = PC_0, V_{Mi}^T CV_{Mi} = 0, V_{mi}^T QV_{mi} = 0 (i=1, 2,3,4).$$

Further, $\lambda C = P^T QP$, where $\lambda$ denotes the scale factor.

Based on the equations $\lambda C = P^T QP$, (3), and (4), the closed form solution for parameters of the video camera can be obtained.

Performing the non-linear optimization includes:

using the preceding closed form solution as the initial value of the following formula and performing non-linear optimization for parameters of the video camera to obtain the minimized function:

$$\sum_{i=1}^{N} \left( \|g(M_c) - m_c\|^2 + \sum_{j=1}^{4} \|h(pl_{Mj}) - pl_{mj}\|^2 \right)$$

where, $g(M_c)$ denotes projection of the point $M_c$ of the space circle on the image plane 702, and $h(pl_{Mj})$ denotes projection of the point $pl_{Mj}$ from the four sides of the rectangle inscribed in the circle on the image plane 702.

The process of determining positions of the feature points of the object in the vicinity of the reference template according to the obtained internal and external parameters of the video camera includes:

assuming that a nameplate is chosen to be the reference object, using the Hough transformation to detect the four sides of the rectangle that are projected on the image plane 702 and meanwhile detect all the straight lines on the nameplate, for example, four borders of the name side, supporting triangle sides, and straight lines in the characters; if the reference object has arc lines, detecting the arc lines;

linearly fitting the coordinate equation of each straight line by using the same method, and obtaining the coordinates of each vertex and coordinates of the angular points and endpoints of characters on the name side according to the intersection of the straight lines; and calculating the coordinates of each feature point on the nameplate in the 3D space, and obtaining and recording the relative position between feature points in the case that sm=PM, $g(M_c)$ denotes projection of point $M_c$ of the space circle on the image plane 702, $h(pl_{Mj})$ denotes projection of point $pl_{Mj}$ from the four sides of the rectangle inscribed in the circle on the image plane 702, through which the image point is obtained, and parameter matrix P of the video camera is given, where the relative position includes the straight lines between two endpoints of the rectangle, distance between points, angular points of characters, distance between endpoints and sides of the rectangle, and so on.

Step 604: The rectangle inscribed in the circle used as the reference template is moved away.

At this time, the rectangle inscribed in the circle used as the reference template can be moved away to facilitate subsequent operations.

Step 605: The video camera is recalibrated according to the reference object.

When the position or shooting angle of the video camera is changed due to a certain reason and recalibration is required, the reference object chosen for preliminary calibration can be used to recalibrate the video camera.

The example that a nameplate is chosen as the reference object is further used here. The video camera can be recalibrated according to information recorded in step 603 about positions of the feature points on the nameplate used as the reference object. In other words, the tessellation is replaced by the calibrated nameplate, and the nameplate is used as a new reference template to recalibrate the video camera. Details thereof are as follows:

shooting the nameplate from at least three perspectives to obtain its images;

using the Hough transformation to detect the straight lines on the nameplate, such as four borders of the name side, supporting triangle sides, and straight lines in the characters;

fitting all the lines and establishing the coordinate equation to obtain the position of each vertex and of the point where the diagonals intersect;

obtaining the coordinates of the image point of the character on the nameplate;

calculating and obtaining the parameters of the video camera according to the coordinates of each point and the linear equation by using the same method as detailed in step 603, namely, obtaining the close form solution of the video camera by using the rectangle inscribed in the circle; and obtaining the non-linear optimization method by using the rectangle inscribed in the circle as described in step 603 to finally obtain the parameters of the video camera.

Currently, the video camera is recalibrated. As described above, to calibrate the video camera in this embodiment, a reference template is required for calibration only when a new scene is to be shot. In preliminary calibration, information of the next reference object needs to be recorded at the same time. Then, it is only necessary to maintain the reference object in the scene to be shot, and the reference object can be used for calibration. It is no longer necessary to use the reference template for calibration each time when the position or shooting angle of the video camera is changed, thus simplifying operations and being applicable to various scenes. Moreover, such a solution is also applicable if the movement of the video camera is unperceivable or uncontrollable. In addition, because a precision machined reference template with given data is used in the preliminary calibration, and data of the reference object recorded in the preliminary calibration is accurate, precision of calibration based on the data of the reference object is quite high.

Figure 8:
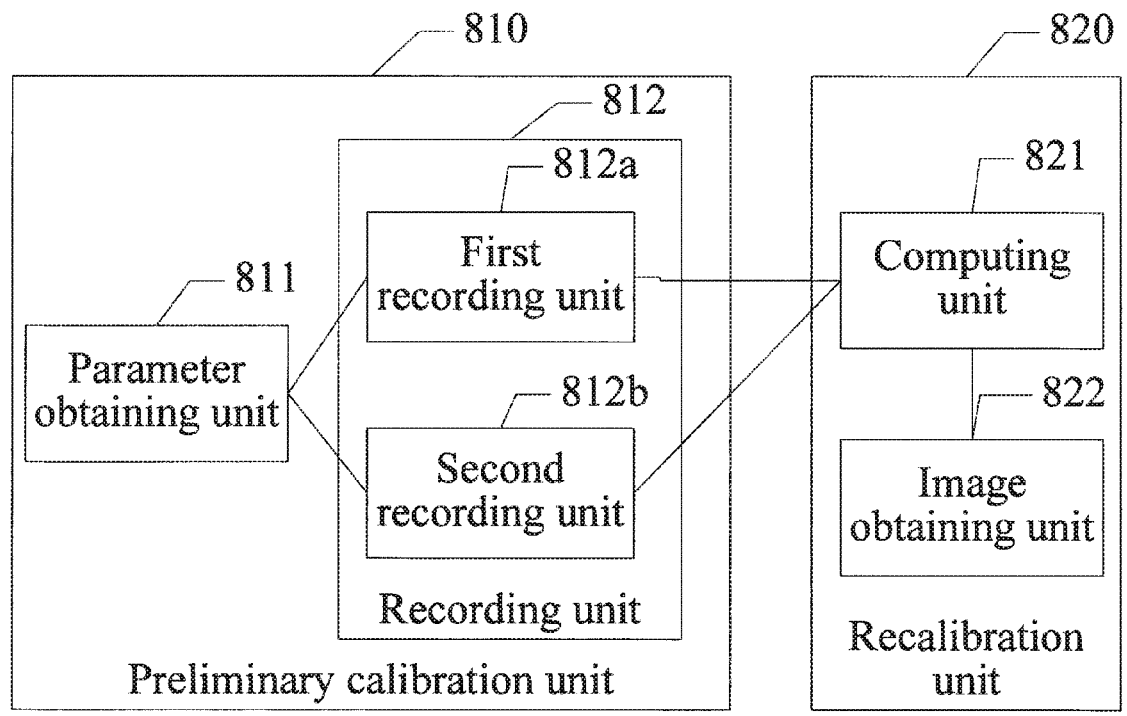
FIG. 8 shows a structure of a first embodiment of an apparatus for calibrating the video camera of the present invention.

FIG. 8 shows a structure of a first embodiment of an apparatus for calibrating the video camera of the present invention. This apparatus includes:

a preliminary calibration unit 810, configured to: obtain internal and external parameters of the video camera according to a reference template, and record data of a reference object in the scene; and a recalibration unit 820, configured to: when the video camera needs calibration, obtain images of the reference object from at least three perspectives, obtain the internal and external parameters of the video camera according to the recorded data of the reference object, and calibrate the video camera.

The preliminary calibration unit 810 includes:

a parameter obtaining unit 811, configured to: obtain the internal and external parameters of the video camera according to the reference template; and a recording unit 812, configured to: record data of the reference object in the scene.

If a tessellation is used as the reference template, the recording unit 812 includes:

a first recording unit 812a, configured to: according to the obtained internal and external parameters of the video camera based on the reference template, determine and record positions of the feature points on the reference object in the vicinity of the tessellation in the scene.

If a rectangle inscribed in a circle is used as the reference template, the recording unit includes:

a second recording unit 812b, configured to: detect the straight lines and/or arc lines on the reference object while detecting the straight lines of the rectangle inscribed in the circle, and record positions of the feature points on the reference object.

The recalibration unit 820 includes:

an image obtaining unit 822, configured to: obtain the images of the reference object from at least three perspectives when the video camera is to be calibrated; and a computing unit 821, configured to: detect features of the reference object to obtain positions of images of the feature points and lines, obtain coordinates of the images of the feature points and lines and corresponding coordinates of the reference object in a world coordinate system, and calculate the internal and external parameters of the video camera according to the coordinates of the images of the feature points, the corresponding coordinates in the world coordinate system, and parameter equations.

If a nameplate is used as the reference object, the computing unit 821 further includes a nameplate computing unit, configured to:

detect the straight lines on the nameplate;

fit each straight line and establish the coordinate equation to obtain positions of each vertex and point where diagonals intersect;

obtain the coordinates of image points of the characters on the nameplate and the corresponding coordinates of the nameplate in the world coordinate system; and calculate the internal and external parameters of the video camera based on the coordinates of the images of the feature points, the corresponding coordinates in the world coordinate system, and the linear equation.

Further, the method for calibrating the video camera provided in the embodiments of the present invention includes:

obtaining the internal and external parameters of the video camera according to the reference template;

recording data of the reference object in the scene; and when the video camera needs calibration, obtaining the images of the reference object from at least two perspectives and the internal and external parameters of the video camera acquired according to the recorded data of the reference object to calibrate the video camera.

Figure 9:
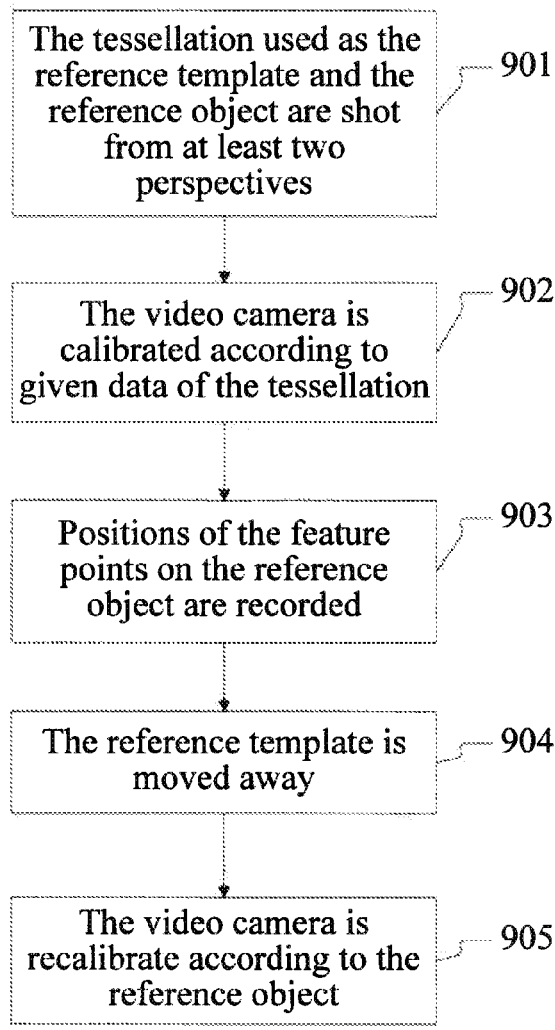
FIG. 9 is a flowchart of a fourth embodiment of a method for calibrating the video camera of the present invention.

FIG. 9 is a flowchart of a fourth embodiment of a method for calibrating the video camera of the present invention. In this method, a tessellation is used as the reference template and is shot by the video camera from at least two perspectives, including the following steps:

Step 901: The tessellation used as the reference template and a reference object are shot from at least two perspectives.

When the video camera is used for shooting a new scene, a tessellation used as the reference template needs to be placed in this scene, and an object in this scene in the vicinity of this tessellation is chosen as the reference object. The object that is not easily taken away is preferred.

After the reference object is chosen, the tessellation used as the reference template and the reference object are shot from at least two perspectives.

Step 902: The video camera is calibrated according to given data of the tessellation.

FIG. 5 shows relation among the tessellation, reference object, image plane, and coordinate system of the video camera.

In FIG. 5, $X_C Y_C Z_C$ denotes the coordinate system of the video camera, and $X_W Y_W Z_W$ denotes the world coordinate system.

The imaging geometrical relationship between image point m(u, v) on image plane 503 and space object point M (X, Y, 0) on tessellation 501 is shown as follows:

$$sm = K[Rt]M$$

where, K denotes the upper triangular matrix of the internal parameters of the video camera, as shown below:

$$K = \begin{bmatrix} k_u & s & p_u \\ 0 & k_v & p_v \\ 0 & 0 & 1 \end{bmatrix}.$$

This auto-calibration is designed to determine the internal parameter matrix K of the video camera, where:

$k_u$ denotes the magnification of the image on the u direction (horizontal direction) in pixel;

$k_v$ denotes the magnification of the image on the v direction (vertical direction) in pixel;

s denotes the distortion factor of the distorted coordinate axis of the camera; and $P_u$ and $P_v$ denote the coordinates of principle points in pixel.

Parameters $k_u$ and $k_v$ are closely related to the focal distance of the video camera. If the sensitization array of the video camera includes square pixels ($k_u = k_v$) and s=0, $k_u$ and $k_v$ denote the focal distance of the video camera in pixel. If the sensitization array includes non-square pixels, for example, the video camera integrating the charge coupled device (CCD), $k_u$ denotes the ratio of the focal distance f to the size of the pixel on u direction, and $k_v$ denotes the ratio of the focal distance f to the size of the pixel on v direction.

Because the tessellation 501 used as the reference template is a precision machined plane template and the data thereof, such as the size, quantity, and sequence of grids, is given, the space object point on tessellation 501 is given data. Assuming that the tessellation 501 lies on the plane of world coordinate system Z=0, the above equation is translated into a perspective projection matrix in the case of homogeneous coordinates as follows:

$$s \begin{bmatrix} u \\ v \\ 1 \end{bmatrix} = K[r_1 \ r_2 \ r_3 \ t] \begin{bmatrix} X \\ Y \\ 0 \\ 1 \end{bmatrix} = K[r_1 \ r_2 \ t] \begin{bmatrix} X \\ Y \\ 1 \end{bmatrix} = H \begin{bmatrix} X \\ Y \\ 1 \end{bmatrix}.$$

In this equation, K denotes the internal parameter matrix of the video camera; $\tilde{M} = [X \ Y \ 1]^T$ denotes the homogeneous coordinates of the space object point M (X, Y, 0) on tessellation 501; $\tilde{m} = [u \ v \ 1]^T$ denote the homogeneous coordinates of the point m(u, v) which corresponds to a point projected from the tessellation 501 onto the image plane 503; R and t respectively denote the spin matrix and translation vector of the coordinate system of the video camera relative to the world coordinate system.

In $$H = [h_1 \ h_2 \ h_3] = \lambda K[r_1 \ r_2 \ t] \Rightarrow r_1 = \frac{1}{\lambda} K^{-1} h_1,$$

$$r_2 = \frac{1}{\lambda} K^{-1} h_2,$$

λ denotes the scale factor.

According to characteristics of the spin matrix, $r_1$ and $r_2$ denote orthogonal vectors, that is, $r_1^T r_2 = 0$ and $\|r_1\| = \|r_2\| = 1$. Each image obtained by shooting can have the following two basic constraints on the internal parameter matrix:

$$h_1^T K^{-T} K^{-1} h_2 = 0 \text{ and } h_1^T K^{-T} K^{-1} h_1 = h_2^T K^{-T} K^{-1} h_2.$$

As five internal parameters of the video camera are unknown, when the number of images obtained by shooting is equal to or greater than three, these five internal parameters of the video camera can be obtained uniquely through the liner equation.

In actual application, standard definition (SD) and even high definition (HD) video cameras have incorporated increasingly sophisticated techniques, the distance between the focal distances on u direction and v direction is shortening, and the principle point of internal parameters of the video camera is approaching the center of the coordinates of the shot image. Therefore, only the focal distance of the video cameras is required to be calculated in many cases. Regarding the internal parameters of the video camera, however, the principle point can be set to be the center of the shot image, for example. In this way, only one parameter is to be obtained. Therefore, when two or more images are to be shot, the focal distance of the video camera can be obtained uniquely through the linear equation.

Based on $h_1^T K^{-T} K^{-1} h_2 = 0$ and $h_1^T K^{-T} K^{-1} h_1 = h_2^T K^{-T} K^{-1} h_2$, the internal parameter K can be obtained. Thus, the spin matrix R and translation vector t used as external parameters of the camera video can be obtained as follows:

$$r_1 = \lambda K^{-1} h_1, r_2 = \lambda K^{-1} h_2, r_3 = r_1 \times r_2, t = \lambda K^{-1} h_3, \text{ where}$$
$$\lambda = 1/\|K^{-1} h_1\| = 1/\|K^{-1} h_2\|.$$

By then, calibration of the video camera is complete.

Step 903: Positions of the feature points on the reference object are recorded.

The obtained internal and external parameters of the video camera are used to determine positions of the feature points on the object in the vicinity of the tessellation, namely, the coordinates of the feature points in the 3D space or in the world coordinate system.

The recording process is detailed as follows.

Generally, according to the epipolar projective geometry, the following can be obtained:

$$\begin{cases} \lambda_i m_i = K[I, 0] M_i = P M_i \\ \lambda'_i m'_i = K[R, t] M_i = P' M_i \end{cases}$$

where, $m_i$ and $m'_i$ respectively denote the two image points of the space points $M_i$ and $M_i'$ on the projection plane of the video camera; $\lambda_i$ and $\lambda'_i$ respectively denote the two scale factors of the projected space points of the video camera on the image plane; P and P' respectively denote the projection matrix of the video camera when the space points are projected on the corresponding image plane; K denotes as the internal parameter matrix of the video camera; and [R, t] denotes the external parameter matrix of the video camera, that is, the spin matrix and the translation vector.

Given available internal and external parameters of the video camera, the coordinates of the space points can be inversely deduced based on the image points, as shown below:

$$\begin{cases} M_i \approx P^+ m_i \\ M'_i \approx (P')^+ m'_i \end{cases}$$

where, $P^+=P^T(PP^T)^{-1}$ and $(P')^+=P'^T(P'\,P^T)^{-1}$ denote the pseudo-inverse matrixes of P and P' respectively; $P=K[I,0]$, $P'=K[R,t]$; $M_i$ and $M'_i$ respectively denote the space points of image points $m_i$ and $m'_i$ inversely projected into the 3D space; and "≈" denotes that only one scale factor is missing in the formula.

Then, positions of the feature points on the reference object are recorded.

Step 904: The tessellation used as the reference template is moved away.

At this time, the tessellation used as the reference template can be moved away to facilitate subsequent operations.

Step 905: The video camera is recalibrated according to the reference object.

When the position or shooting angle of the video camera is changed due to a certain reason and recalibration is required, the reference object in the preliminary calibration can be used to recalibrate the video camera.

Assuming that a nameplate is chosen as the reference object, the video camera can be recalibrated according to information recorded in step 903 about positions of the feature points on the nameplate used as the reference object. In other words, the tessellation is replaced by the calibrated nameplate, and the nameplate is used as a new reference template to recalibrate the video camera. Details thereof are as follows:

shooting the nameplate from at least two perspectives to obtain the images;

using the Hough transformation to detect the straight lines on the nameplate, such as four borders of the name side, supporting triangle sides, and straight lines in the character;

fitting all the lines and establishing the coordinate equation to obtain the positions of each vertex and point where the diagonals intersect; and obtaining the coordinates of image points of the characters on the nameplate and the corresponding coordinates of the nameplate in the world coordinate system; and calculating the internal and external parameters of the video camera based on the coordinates of the images of the feature points, the corresponding coordinates in the world coordinate system, and the linear equation.

Currently, the video camera is recalibrated. As described above, to calibrate the video camera in this embodiment, a reference template is required for calibration only when a new scene is to be shot. In preliminary calibration, information of the next reference object needs to be recorded at the same time. Then, it is only necessary to maintain the reference object in the scene to be shot, and the reference object can be used for calibration. It is no longer necessary to use the reference template for calibration each time when the position or shooting angle of the video camera is changed, thus simplifying operations and being applicable to various scenes. Moreover, such a solution is also applicable if the movement of the video camera is unperceivable or uncontrollable. In addition, because a precision machined reference template with given data is used in the preliminary calibration, and data of the reference object recorded in the preliminary calibration is accurate, precision of calibration based on the data of the reference object is quite high.

Further, when a rectangle inscribed in a circle is used as the reference template, the reference template can be shot from at least two perspectives.

Figure 10:
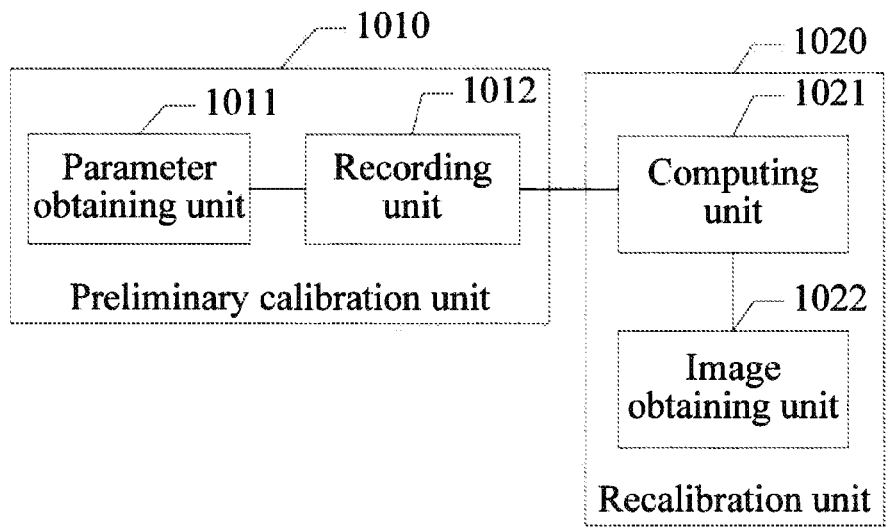
FIG. 10 shows a structure of a second embodiment of an apparatus for calibrating the video camera of the present invention.

FIG. 10 shows a structure of a second embodiment of an apparatus for calibrating the video camera of the present invention. This apparatus includes:

a preliminary calibration unit 1010, configured to: obtain internal and external parameters of the video camera according to a reference template, and record data of a reference object in the scene; and a recalibration unit 1020, configured to: when the video camera needs calibration, obtain images of the reference object from at least two perspectives, obtain the internal and external parameters of the video camera based on the recorded data of the reference object, and calibrate the video camera.

The preliminary calibration unit 1010 includes:

a parameter obtaining unit 1011, configured to obtain the internal and external parameters of the video camera according to the reference template; and a recording unit 1012, configured to record the data of the reference object in the scene.

The recalibration unit 1020 includes:

an image obtaining unit 1022, configured to: obtain the images of the reference object from at least two perspectives when the video camera is to be calibrated; and a computing unit 1021, configured to: detect features of the reference object to obtain positions of images of the feature points and lines, obtain coordinates of the images of the feature points and lines and corresponding coordinates of the reference object in a world coordinate system, and calculate the internal and external parameters of the video camera according to the coordinates of the images of the feature points, the corresponding coordinates in the world coordinate system, and parameter equations.

It is understandable for those skilled in the art that all or some steps described in forgoing embodiments can be implemented by related hardware instructed by programs. The programs can be saved in a readable storage medium, for example, a read-only memory (ROM), a disk, or an optical disk.

A method and an apparatus for calibrating the video camera are provided in the embodiments of the present invention. This application elaborates specific examples involving the principles and implementation of the present invention to facilitate the understanding of methods and core ideas of the present invention. Furthermore, those skilled in the art may make various modifications and variations to the implementation methods and application areas according to the ideas of the present invention. Therefore, the content of this specification shall not be construed to have confined the scope of the present invention.

What is claimed is:

1. A method for calibrating a video camera, comprising:
   obtaining internal and external parameters of the video camera according to a reference template to calibrate the camera preliminarily, and recording data of a reference object in the same scene with the reference template; and
   when the video camera needs recalibration, obtaining images of the reference object from at least two perspectives, obtaining the internal and external parameters of the video camera at the time based on the recorded data and the images of the reference object, recalibrating the video camera base on the images of the reference object from at least two perspectives and the internal and external parameters of the video camera at the time.

2. The method for calibrating the video camera according to claim 1, wherein:
   the obtaining images of the reference object from at least two perspectives comprises:

obtaining images of the reference object from at least three perspectives.

3. The method for calibrating the video camera according to claim 1, wherein:
the recording of the data of the reference object in the same scene with the reference template comprises: determining and recording positions of feature points on the reference object in the vicinity of the reference template in the scene based on the obtained internal and external parameters of the video camera according to the reference template.

4. The method for calibrating the video camera according to claim 2, wherein:
the recording of the data of the reference object in the same scene with the reference template comprises: determining and recording positions of feature points on the reference object in the vicinity of the reference template in the scene based on the obtained internal and external parameters of the video camera according to the reference template.

5. The method for calibrating the video camera according to claim 3, wherein:
the reference template is a rectangle inscribed in a circle; and
the feature points on the reference object comprises: the feature points on the straight lines and/or arc lines on the reference object.

6. The method for calibrating the video camera according to claim 1, wherein:
the reference object is a nameplate; and
the obtaining the internal and external parameters of the video camera at the time based on the recorded data and the images of the reference object to recalibrate the video camera comprises: detecting straight lines of the nameplate in the obtained images; fitting each straight line and establishing a coordinate equation to obtain positions of each vertex and point where diagonals intersect; obtaining coordinates of image points of characters on the nameplate and corresponding coordinates of the nameplate in a world coordinate system; and calculating the internal and external parameters of the video camera based on coordinates of images of the feature points, the corresponding coordinates in the world coordinate system, and linear equations.

7. The method for calibrating the video camera according to claim 2, wherein:
the reference object is a nameplate; and
the obtaining the internal and external parameters of the video camera at the time based on the recorded data and the images of the reference object to recalibrate the video camera comprises: detecting straight lines of the nameplate in the obtained images; fitting each straight line and establishing a coordinate equation to obtain positions of each vertex and point where diagonals intersect; obtaining coordinates of image points of characters on the nameplate and corresponding coordinates of the nameplate in a world coordinate system;
and calculating the internal and external parameters of the video camera based on coordinates of images of the feature points, the corresponding coordinates in the world coordinate system, and linear equations.

8. The method for calibrating the video camera according to claim 3, wherein:
the reference object is a nameplate; and
the obtaining the internal and external parameters of the video camera at the time based on the recorded data and the images of the reference object to recalibrate the video camera comprises: detecting straight lines of the nameplate in the obtained images; fitting each straight line and establishing a coordinate equation to obtain positions of each vertex and point where diagonals intersect; obtaining coordinates of image points of characters on the nameplate and corresponding coordinates of the nameplate in a world coordinate system; and calculating the internal and external parameters of the video camera based on coordinates of images of the feature points, the corresponding coordinates in the world coordinate system, and linear equations.

9. The method for calibrating the video camera according to claim 4, wherein:
the reference object is a nameplate; and
the obtaining the internal and external parameters of the video camera at the time based on the recorded data and the images of the reference object to recalibrate the video camera comprises: detecting straight lines of the nameplate in the obtained images; fitting each straight line and establishing a coordinate equation to obtain positions of each vertex and point where diagonals intersect; obtaining coordinates of image points of characters on the nameplate and corresponding coordinates of the nameplate in a world coordinate system; and calculating the internal and external parameters of the video camera based on coordinates of images of the feature points, the corresponding coordinates in the world coordinate system, and linear equations.

10. An apparatus for calibrating a video camera, comprising:
a preliminary calibration unit, adapted to: obtain internal and external parameters of the video camera according to a reference template, and record data of a reference object in the same scene with the reference template; and
a recalibration unit, adapted to: when the video camera needs recalibration, obtain images of the reference object from at least two perspectives, obtain the internal and external parameters of the video camera at the time according to the recorded data of the reference object, calibrate the video camera base on the images of the reference object from at least two perspectives and the internal and external parameters of the video camera at the time.

11. The apparatus for calibrating the video camera according to claim 10, wherein the preliminary calibration unit comprises:
a parameter obtaining unit, adapted to: obtain the internal and external parameters of the video camera according to the reference template; and
a recording unit, adapted to: record the data of the reference object in the scene.

12. The apparatus for calibrating the video camera according to claim 11, wherein:
the reference template is a tessellation; and
the recording unit comprises a first recording unit, adapted to: according to the obtained internal and external parameters of the video camera based on the reference template, determine and record positions of feature points on the reference object in the vicinity of the tessellation in the scene.

13. The apparatus for calibrating the video camera according to claim 11, wherein:
the reference template is a rectangle inscribed in a circle; and
the recording unit comprises a second recording unit, adapted to: when detecting straight lines of the rectangle inscribed in the circle, detect straight lines and/or arc lines on the reference object, and record positions of feature points on the reference object.

14. The apparatus for calibrating the video camera according to claim 10, wherein the recalibration unit comprises:
an image obtaining unit, adapted to: obtain the images of the reference object from at least two perspectives when the video camera is to be recalibrated; and
a computing unit, adapted to: detect features of the reference object to obtain positions of images of the feature points and lines; obtain coordinates of the images of the feature points and lines and corresponding coordinates of the reference object in a world coordinate system; and calculate the internal and external parameters of the video camera according to the coordinates of the images of the feature points, the corresponding coordinates in the world coordinate system, and parameter equations.

15. The apparatus for calibrating the video camera according to claim 11, wherein the recalibration unit comprises:
an image obtaining unit, adapted to: obtain the images of the reference object from at least two perspectives when the video camera is to be recalibrated; and
a computing unit, adapted to: detect features of the reference object to obtain positions of images of the feature points and lines; obtain coordinates of the images of the feature points and lines and corresponding coordinates of the reference object in a world coordinate system; and calculate the internal and external parameters of the video camera according to the coordinates of the images of the feature points, the corresponding coordinates in the world coordinate system, and parameter equations.

16. The apparatus for calibrating the video camera according to claim 12, wherein the recalibration unit comprises:
an image obtaining unit, adapted to: obtain the images of the reference object from at least two perspectives when the video camera is to be recalibrated; and
a computing unit, adapted to: detect features of the reference object to obtain positions of images of the feature points and lines; obtain coordinates of the images of the feature points and lines and corresponding coordinates of the reference object in a world coordinate system; and calculate the internal and external parameters of the video camera according to the coordinates of the images of the feature points, the corresponding coordinates in the world coordinate system, and parameter equations.

17. The apparatus for calibrating the video camera according to claim 13, wherein the recalibration unit comprises:
an image obtaining unit, adapted to: obtain the images of the reference object from at least two perspectives when the video camera is to be recalibrated; and
a computing unit, adapted to: detect features of the reference object to obtain positions of images of the feature points and lines; obtain coordinates of the images of the feature points and lines and corresponding coordinates of the reference object in a world coordinate system; and calculate the internal and external parameters of the video camera according to the coordinates of the images of the feature points, the corresponding coordinates in the world coordinate system, and parameter equations.

18. The apparatus for calibrating the video camera according to claim 14, wherein:
the reference object is a nameplate; and
the computing unit comprises a nameplate computing unit, adapted to: detect straight lines of the nameplate; fit each straight line and establish a coordinate equation to obtain positions of each vertex and point where diagonals intersect; obtain coordinates of image points of characters on the nameplate and corresponding coordinates of the nameplate in the world coordinate system; and calculate the internal and external parameters of the video camera based on the coordinates of the images of the feature points, the corresponding coordinates in the world coordinate system, and linear equations.

19. The apparatus for calibrating the video camera according to claim 15, wherein:
the reference object is a nameplate; and
the computing unit comprises a nameplate computing unit, adapted to: detect straight lines of the nameplate; fit each straight line and establish a coordinate equation to obtain positions of each vertex and point where diagonals intersect; obtain coordinates of image points of characters on the nameplate and corresponding coordinates of the nameplate in the world coordinate system; and calculate the internal and external parameters of the video camera based on the coordinates of the images of the feature points, the corresponding coordinates in the world coordinate system, and linear equations.

* * * * *

UNITED STATES PATENT AND TRADEMARK OFFICE
CERTIFICATE OF CORRECTION

PATENT NO. : 8,436,904 B2
APPLICATION NO. : 12/757211
DATED : May 7, 2013
INVENTOR(S) : Li et al.

Page 1 of 1

It is certified that error appears in the above-identified patent and that said Letters Patent is hereby corrected as shown below:

In the Claims:

Column 16, line 61, "base" should read -- based --.

Signed and Sealed this
Sixteenth Day of July, 2013

Teresa Stanek Rea
*Acting Director of the United States Patent and Trademark Office*